United States Patent

Plantan

[11] 4,003,606
[45] Jan. 18, 1977

[54] BRAKE SYSTEM
[75] Inventor: Ronald S. Plantan, Wickliffe, Ohio
[73] Assignee: White Motor Corporation, Cleveland, Ohio
[22] Filed: Oct. 6, 1975
[21] Appl. No.: 620,069
[52] U.S. Cl. .................................. 303/9; 188/170; 303/13; 303/63
[51] Int. Cl.[2] ......................................... B60T 13/36
[58] Field of Search ............ 188/170, 106 P; 92/64; 303/2, 9, 13, 62, 63, 85

[56] References Cited
UNITED STATES PATENTS

| | | | |
|---|---|---|---|
| 3,712,181 | 1/1973 | Swander et al. | 188/170 X |
| 3,917,037 | 11/1975 | Prillinger | 188/170 |
| 3,947,072 | 3/1976 | Plantan | 303/13 |
| 3,954,304 | 5/1976 | Engle | 303/13 |

Primary Examiner—Duane A. Reger
Attorney, Agent, or Firm—Watts, Hoffmann, Fisher & Heinke Co.

[57] ABSTRACT

In a vehicle brake system of the type employing both spring and service brake actuators, fluid which is discharged from the spring brake actuators at the initiation of spring brake application is exhausted through selected service brake actuators to effect at least a momentary service brake application. Since spring brakes normally respond relatively slowly as compared to service brakes, service brake application can be effected prior to spring brake application, and brake response time is reduced. The service brake actuators selected to receive exhausted spring brake fluid can be arranged to brake vehicle wheels which have no associated spring brake actuators, whereby emergency braking capability can be provided on vehicle wheels which have no spring brake actuators.

17 Claims, 2 Drawing Figures

BRAKE SYSTEM

BACKGROUND OF THE INVENTION

1. Field of the Invention

The present invention relates to vehicle brake systems of the type employing both spring brake actuators and service brake actuators, and more particularly, to a brake system where fluid which has been discharged from the spring brake actuators to effect spring brake application is exhausted through the service brake actuators to momentarily effect brake application through the service brake actuators.

2. Prior Art

Many heavy-duty, over-the-road vehicles are provided with brake systems including both service and spring brake actuators which selectively effect brake application. The service and spring brake actuators may be arranged to brake separate vehicle wheels, or may be arranged in tandem to brake common wheels.

The service brake actuators are normally used to arrest vehicle movement. Each of the service brake actuators has a service brake chamber which, when supplied with pressurized fluid, effects a vehicle braking action.

The spring brake actuators are normally used when the system has failed. Each of the spring brake actuators has a spring brake chamber and one or more springs for effecting brake application if the fluid pressure in the spring brake chamber is below a predetermined level. When the spring brake chambers are pressurized above this level, the biasing action of the springs is overcome, and brake application is released.

It is common to mount a pair of spring and service brake actuators in tandem for operating a common brake control member. The control member extends to apply a braking force if either of two conditions obtain, namely if fluid pressure in the service brake chamber is above a first level, (typically about 4 or 5 psi), or if fluid pressure in the spring brake chamber is below a second level (typically about 50–60 psi).

Service and spring brake conduit networks respectively communicate the service and spring brake chambers with a source of pressurized fluid. Each of the conduit networks includes valving for selectively pressurizing and exhausting its associated brake chambers. When the service brake supply network is not being pressurized to effect brake application through the service brake actuators, this network is normally vented to atmosphere.

One or more quick-release valves are normally provided in the spring brake conduit network to facilitate rapid exhaustion of the spring brake chambers to atmosphere. If an emergency stop must be made at a time when the service brake supply network has failed, the quick-release valves enable the spring brake actuators to be rapidly brought into play to stop the vehicle. Since the spring brake chambers are normally pressurized at about 100–200 psi, a brief period of time (typically about 750 milliseconds) is required to exhaust the spring brake chambers to a pressure (of about 50–60 psi) where spring brake application can begin. Full spring brake application does not take place until the spring brake chambers are exhausted to ambient pressure.

Many over-the-highway vehicles have selected wheels which are provided solely with service brake actuators, while other wheels are provided with tandem spring and service brake actuators. In an emergency situation where the service brake supply network has failed and vehicle movement must be arrested, only the vehicle wheels provided with spring brake actuators can be braked. While it would be desirable to provide the nonspring-braked wheels with an emergency braking capability, no way has previously been found to achieve this result.

SUMMARY OF THE INVENTION

The present invention overcomes the foregoing and other drawbacks of the prior art by providing a novel and improved brake system where selected service brake actuators are brought momentarily into operation during an emergency stop by exhausting spring brake fluid into the service brake chambers.

Instead of exhausting spring brake fluid through a quick-release valve to the atmosphere, as is done in prior brake systems, the present invention utilizes this fluid by ducting at least a portion of it into selected service brake chambers. The brief pressure build-up caused in the service brake chambers brings the service brake actuators into operation to augment the operation of the spring brake actuators.

Since the service brake actuators require only relatively low pressure fluid to operate, they can effect brake application substantially ahead of the time when the spring brake chambers are depressurized sufficiently to initiate brake application. Tests have shown that this method of effecting brake application with spring brake exhaust fluid can decrease emergency brake application time from the usual 750 milliseconds to 200 milliseconds or less.

Such reduced brake application time is a significant safety improvement that is achieved without substantial cost. Existing brake systems can be easily and inexpensively converted to give this feature simply by providing the necessary conduit interconnection between the service and spring brake conduit networks. Where brake units having tandem spring and service brake chambers are used, the required conduit interconnection can be made either externally or internally of the tandem actuator units.

The system of the present invention can enhance lateral stability of a vehicle during emergency braking. A problem with some prior emergency braking systems has been that at the initiation of operation, on occasions they may substantially lock the braked wheels. The system of the present invention can be used to bring only selected braked wheels rapidly into operation with other wheels being subsequently braked. This sequential braking action enhances lateral stability. Moreover, fluid exhausted from the spring brake actuators can be ducted through conventional antiskid, antilock control valves to prevent wheel skidding and locking.

The service brake actuators selected to receive exhausted spring brake fluid need not be associated with the same wheels as are braked by the spring brake actuators. By exhausting spring brake fluid through the service brake actuators of wheels which have no associated spring brake actuators, the nonspring-braked wheels are given an emergency braking capability. Moreover, this system of providing nonspring-braked wheels with an emergency braking capability can be added relatively easily and inexpensively to existing vehicles simply by interconnecting their spring brake exhaust ports with the service brake chambers associated with nonspring-braked wheels.

A check valve and vent conduit system is used to effect the transfer of pressurized fluid from the spring brake chambers to the service brake chambers without significantly increasing the time required to bring the spring brake actuators into operation. A check valve permits the initial rapid transfer of fluid from the spring brake chambers to the service brake chambers. Once a majority of such fluid has been transferred and service brake application is initiating, the check valve closes. A relatively large orifice then rapidly exhausts any remaining fluid from the spring brake chambers, while a relatively small orifice provides a slow depletion of fluid from the service brake chambers. By this arrangement, service brake application is effected rapidly and is sustained at least until spring brake application is effected.

The system of the present invention enables smaller capacity, less expensive spring brake actuator units to be used on some vehicle installations in view of the fact that in emergency stop situations, service brake actuators which would otherwise be inoperative can be brought momentarily into play to assist the spring brake actuators. The system of the present invention likewise permits the use of a lesser number of spring brake actuator units on some vehicles in view of the fact that nonspring-braked wheels can now be provided with a momentary emergency braking capability. The use of a lesser number of spring brake actuator units provides the advantages of lower vehicle cost and reduced vehicle weight.

As will be apparent from the foregoing, it is a general object of the present invention to provide a novel and improved braking system.

Other objects and a fuller understanding of the invention may be had by referring to the following description and claims taken in conjunction with the accompanying drawings.

DESCRIPTION OF THE PREFERRED EMBODIMENT

Figure 1:
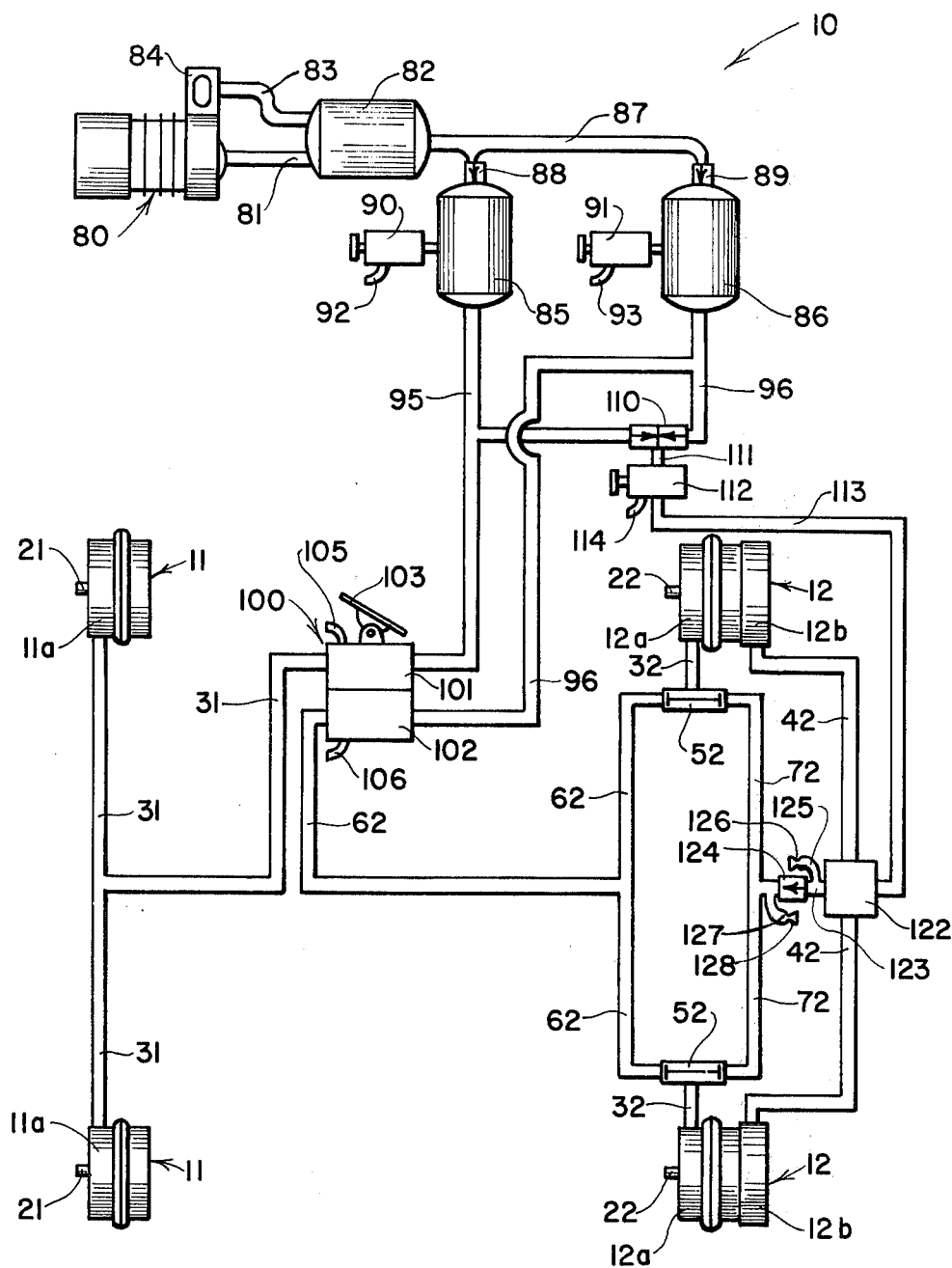
FIGS. 1 and 2 are schematic diagrams of two different brake systems embodying the present invention.

Referring to FIG. 1, a vehicle brake system is shown generally at 10. The brake system 10 includes two front wheel brake actuators 11 and two rear wheel actuators 12.

In the description which follows, the brake system 10 is described as applied to a four wheel truck having pneumatically operated brakes. The front wheel brake actuators 11 are conventional pneumatic truck brake actuators having service chambers 11a and having extensible push rods 21. A front service brake conduit 31 communicates with the service brake chambers 11a. When pressurized air is supplied by the front conduit 31 to the service brakes chambers 11a, the push rods 21 extend to effect braking of the truck front wheels (not shown). When air is exhausted from the front conduit 31, the push rods 21 retract to release the front wheel brakes.

The rear wheel brake actuators 12 are conventional pneumatic truck brake actuators having tandem service and spring brake chambers 12a, 12b, and extensible push rods 22. Rear service brake conduits 32 communicate with service brake chambers 12a. Rear spring brake supply conduits 42 communicate with spring brake chambers 12b.

During normal vehicle operation, pressurized air is supplied through the spring brake conduits 42 to the spring brake chambers 12b to release the rear wheel brakes. When air is exhausted from the spring brake chambers 12b, the spring brake actuators are operative to effect extension of the push rods 22 to brake the rear truck wheels (not shown). During normal vehicle operation, the service brake chambers 12a are operative when pressurized by air supplied from the service brake conduits 32 to extend the push rods 22 and apply the rear wheel brakes. When air is exhausted from the service chambers 12a, the push rods 22 retract.

A pair of shuttle valves 52 communicate with the rear service brake conduits 32, and with a pair of supply conduits 62, 72. The shuttle valves 52 permit the flow of air between the supply conduits 62, 72 and the service brake conduits 32. In the event that the air pressure in the supply conduit 62 is higher than in the supply conduit 72, the shuttle valves 52 will communicate only the conduits 62, 32. In the event that the air pressure in the supply conduit 72 is higher than in the supply conduit 62, the shuttle valves 52 will communicate the conduits 72, 32, but will also permit a restricted flow of air into the conduit 62.

Pressurized air is supplied to the brake system 10 by a compressor 80. A compressor conduit 81 receives pressurized air from the compressor 80. A main reservoir 82 receives pressurized air from the compressor conduit 81. A return conduit 83 communicates with the reservoir 82. A governor 84 communicates with the return conduit 83 and with the air compressor 80. When the pressure in the main reservoir 82 reaches a predetermined level, the governor 84 permits pressurized air to circulate through the compressor and return conduits 81, 83 between the reservoir 82 and the governor 84 to prevent a further increase in pressure in the reservoir 82.

A primary reservoir 85 and a secondary reservoir 86 are supplied with pressurized air from the main reservoir 82. A feeder conduit 87 receives pressurized air from the main reservoir 82. A pair of check valves 88, 89 communicate with the feeder conduit 87 and the reservoirs 85, 86. The check valves 88, 89 permit the flow of pressurized air into the reservoirs 85, 86 from the feeder conduit 87, and prevent reverse flow. A pair of hand operated valves 90, 91 communicate with the reservoirs 85, 86 and with a pair of vent conduits 92, 93. When the valves 90, 91 are opened, they vent the reservoirs 85, 86 to atmosphere through the vent conduits 92, 93.

A primary supply conduit 95 and a secondary supply conduit 96 communicate respectively with the reservoirs 85, 86. The supply conduits 95, 96 have branches which communicate with a foot-operated control 100, and with a double check valve 110.

The foot-operated control 100 includes a pair of side-by-side valves 101, 102 which are operated by a common foot pedal 103. The valve 101 communicates with the supply conduit 95, with the front supply conduit 31, and with a vent conduit 105. The valve 102 communicates with the supply conduit 96, with the rear supply conduit 62, and with a vent conduit 106.

The food pedal 103 is biased upwardly to the position shown in FIG. 1. When the pedal 103 is in this position, the valve 101 communicates the front supply and vent conduits 31, 105, venting the front supply conduit 31 to atmosphere; and the valve 102 communicates the rear supply and vent conduits 62, 106, venting the rear supply conduit 62 to atmosphere.

When the foot pedal 103 is depressed, the valves 101, 102 communicate the primary and secondary supply conduits 95, 96 respectively with the front and rear supply conduits 31, 62. Pressurized air then flows from the reservoirs 85, 86 to the service brake chambers 11a, 12a, effecting service brake application of the front and rear wheel brakes. Once the foot pedal 103 is released and returns to its upward position, the valves 101, 102 vent the front and rear supply conduits 31, 62 to atmosphere exhausting the service brake chambers 11a, 12a and releasing the front and rear wheel brakes.

A junction conduit 111 communicates with the double check valve 110. The double check valve 110 is operative to permit the flow of pressurized air from the primary and secondary supply conduits 95, 96 to the junction conduit 111, and to prevent reverse flow. In the event that the air pressure in one of the supply conduits 95, 96 is higher than in the other of the conduits 95, 96, the check valve 110 will communicate only the higher pressurized one of the supply conduits 95, 96 with the junction conduit 111.

A hand-operated valve 112 communicates with the junction conduit 111, with a transfer conduit 113, and with a vent conduit 114. The valve 112 is operative to selectively communicate the transfer conduit 113 with the junction conduit 111 or with the vent conduit 114. When the valve 112 communicates the junction and transfer conduits 111, 113, pressurized air is supplied from the double check valve 110 to the transfer conduit 113. When the valve 112 communicates the transfer and vent conduits 113, 114, the transfer conduit 113 is vented to atmosphere.

A quick-release valve 122 communicates with the spring brake conduits 42, the transfer conduit 113, and with a feeder conduit 123. When the pressure in the transfer conduit 113 exceeds a predetermined level, the quick-release valve 122 communicates the transfer and spring brake conduits 113, 42. When the pressure in the transfer conduit 113 drops below a predetermined level, the quick release valve 122 communicates the spring brake conduits 42 and the feeder conduit 123, venting the spring brake conduits 42 into the feeder conduit 123.

A check valve 124 communicates the feeder conduit 123 and the supply conduit 72. The check valve 124 permits fluid flow from the feeder conduit 123 into the supply conduit 72, but prevents reverse flow.

A vent conduit 125 communicates with the feeder conduit 123 and has an orifice 126 which permits a controlled discharge to atmosphere of fluid from the feeder conduit 123. A vent conduit 127 communicates with the supply conduit 72 and has an orifice 128 which permits a controlled discharge to atmosphere of fluid from the supply conduit 72. The feeder conduit vent orifice 126 is of larger diameter than the supply conduit vent orifice 128 and, accordingly, permits a much faster discharge of pressurized fluid from the feeder conduit 123 than is permitted from the supply conduit 72.

The hand-operated valve 112 is an operator control for effecting a spring brake application of the rear wheel brakes. When the valve 112 is "popped" to vent the transfer conduit 113 to atmosphere, the quick-release valve 122 responds by exhausting the spring brake conduits 42 into the feeder conduit 123. While some of the pressurized air exhausted into the feeder conduit passes through the vent orifice 126 and is discharged to atmosphere, most of it passes through the check valve 124, through the supply conduit 72, through the shuttle valves 52 and into the service brake chambers 12a, effecting a rapid service brake application of the rear wheel brakes.

Since the feeder conduit vent orifice 126 is substantially larger than the supply conduit vent orifice 128, the pressure in the feeder conduit 123 will diminish substantially more rapidly than will the pressure in the supply conduit 72. Once the pressure in the feeder conduit 123 has dropped below that in the supply conduit 72 (a condition reached quite rapidly following the initiation of spring brake exhaustion) the check valve 124 closes and prevents flow from the supply conduit 72 into the feeder conduit 123.

The feeder and supply conduits 123, 72 exhaust independently of each other at rates controlled by their respective orifices 126, 128. The feeder conduit 123 exhausts relatively rapidly bringing the spring brake actuators 12b into prompt operation. The supply conduit 72 exhausts relatively slowly to hold the service brake actuators 12a on until the spring brake actuators 12b come into play. Service brake application of the rear wheel brakes will continue until the rear service brake chambers are exhausted to atmosphere.

Since service brake application is initiated at very low positive pressures, typically beginning at around 4 or 5 psi, the air exhausted from the spring brake chambers 12b into the service brake chambers 12a effects rapid application of the rear wheel brakes. Spring brake application does not begin until the pressure in the spring brake chambers 12b has dropped from its normal level of about 100–120 psi to an operating level of about 50–60 psi. When the pressure in the spring brake chambers 12b reaches the 50–60 psi operating level, application of spring pressure to the rear wheel brakes is begun. As the spring brake chambers 12b continue to be exhausted, full spring brake application pressure is effected. Shortly after full spring brake application pressure is effected, the service brake chambers 12a are exhausted, and the service brake chambers 12a no longer continue to assist in applying the brakes.

One advantage which is achieved by exhausting spring brake fluid into the service brake chambers 12a is to effect a more rapid application of the rear wheel brakes than would occur if the spring brake fluid were exhausted to atmosphere. Another advantage is that by concurrently initiating spring and service brake application of the rear wheel brakes, emergency braking capacity is increased over that which would result if only a spring brake application were used.

Figure 2:
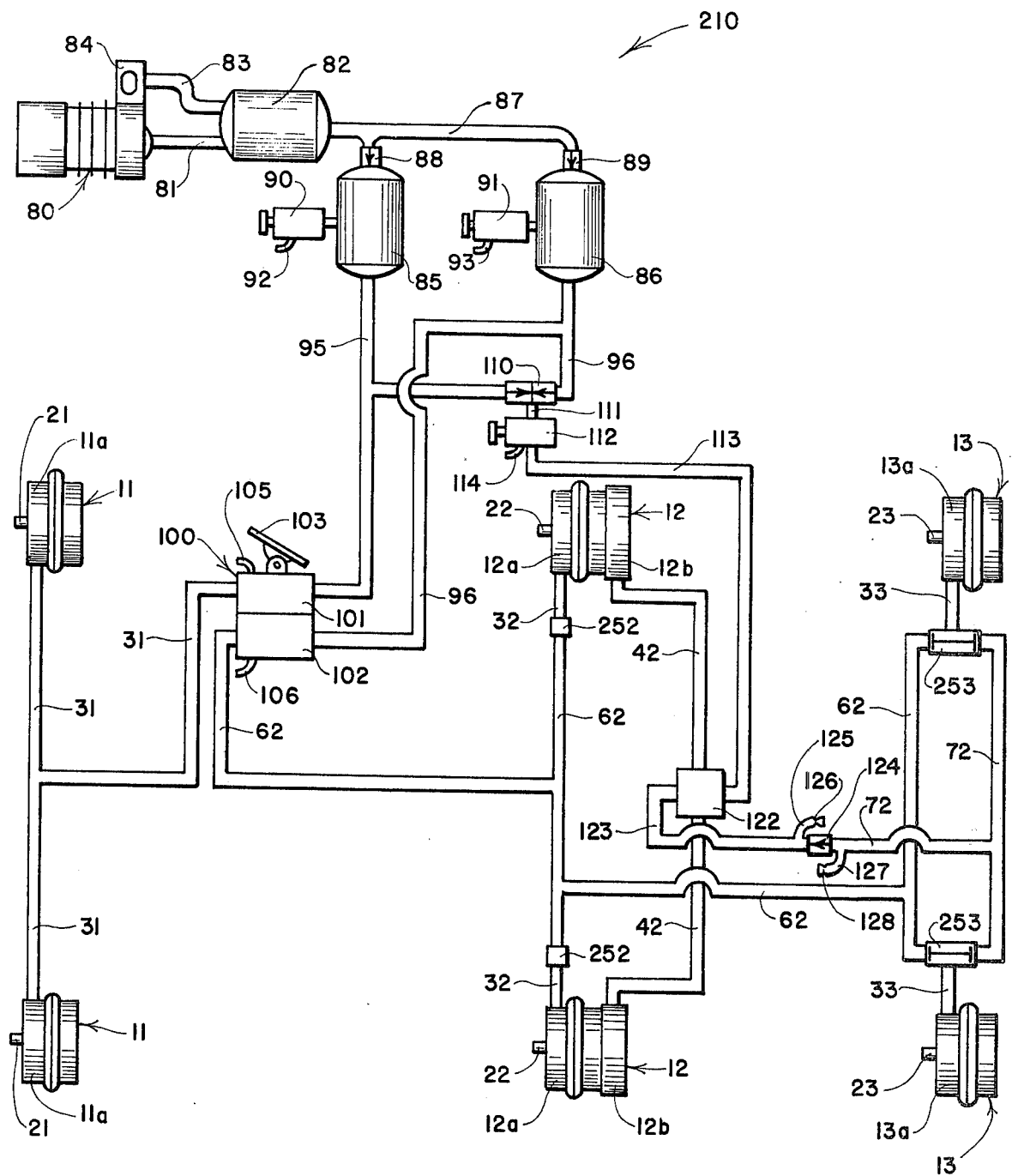

Referring to FIG. 2, a second embodiment of a brake system embodying the present invention is indicated generally by the numeral 210. Much of the brake system 210 is identical to the brake system 10, and the same reference numerals have been used in both of the brake systems 10, 210 to indicate identical components.

The brake system 210 differs from the brake system 10 in that an additional pair of rear wheel brake actuators 13 are provided, and air exhausted from the spring brake chambers 12b is used to effect service brake application of the rear wheel brake actuators 13.

The rear wheel brake actuators 13 are conventional pneumatic truck brake actuators having service chambers 13a and extensible push rods 23. Service brake conduits 33 communicate with the service brake chambers 13a. When pressurized air is supplied by the service brake conduits 33 to the service brake chambers 13a, the push rods 23 extend to effect braking of associated truck rear wheels (not shown). When air is exhausted from the service brake conduits 33, the push rods 23 retract to release the associated wheel brakes.

The shuttle valves 52 are eliminated in the brake system 210 and are replaced by pipe couplings 252 which communicate the supply and service conduits 32, 62. New shuttle valves 253 are provided near the rear wheel brake actuators 13. The shuttle valves 253 communicate with the service brake conduits 33, and with the supply conduits 62, 72. The shuttle valves 253 permit the flow of air between the supply conduits 62, 72 and the service brake conduits 33. In the event that air pressure in the supply conduit 62 is higher than in the supply conduit 72, the shuttle valves 253 will communicate only the conduits 62, 33. In the event that the air pressure in the supply conduit 72 is higher than in the supply conduit 62, the shuttle valves 253 will communicate the conduits 72, 33, but will also permit a restricted flow of air into the supply conduit 62.

The brake system 210 operates in the same manner as the brake system 10. In normal operation, when the foot pedal 103 is depressed, the valves 101, 102 will supply pressurized air to the service brake chambers 11a, 12a, 13a effecting service brake application of the associated brakes. If an emergency stop is required, as when the service brake supply system has failed, the hand-operated valve 112 is "popped" exhausting air from the spring brake chambers 12b through the spring brake conduits 42, through the quick release valve 122, through the feeder conduit 123, through the check valve 124, through the supply conduit 72 and through the shuttle valves 253 into the service brake chambers 13a. This effects a rapid service brake application through the brake actuators 13, followed by a spring brake application through the brake actuators 12. Once the air supplied to the service brake chambers 13a from the spring brake chambers 12b has been exhausted, the service brake application through the brake actuators 13 is released.

As will be apparent, in the brake system embodiment 210, the fluid exhausted from the service brake chambers 12b is used to achieve an emergency braking capability at a pair of rear truck wheels that have no spring brake actuators.

A feature of the system of the present invention is that conventional antiskid, antilock control valves can be included in the supply conduits 72 to regulate the supply of fluid exhausted from spring brake actuators to prevent the skidding or locking of wheels braked by service brake actuators to which exhaust fluid is supplied.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A vehicle brake system, comprising:
 a. a service brake subsystem;
 b. a spring brake subsystem; and,
 c. a valve connected to both subsystems for selectively transferring pressurized fluid from said spring brake subsystem into said service brake subsystem to actuate at least a portion of the service brake subsystem.

2. The brake system of claim 1 wherein:
 a. said service brake subsystem includes a plurality of service brake actuators each having a separate service brake chamber;
 b. said spring brake subsystem includes a plurality of spring brake actuators each having a separate spring brake chamber; and,
 c. a plurality of valves are provided with each positioned selectively to communicate selected of said spring brake chambers with selected of said service brake chambers.

3. The brake system of claim 2 wherein:
 a. certain of said spring brake chambers are positioned in tandem with certain of said service brake chambers to operate common brake actuators; and,
 b. said valves are operative to communicate some of said certain spring brake chambers with their tandem service brake chambers at the initiation of spring brake application.

4. The brake system of claim 2 wherein:
 a. some of said selected spring brake chambers are positioned in tandem with certain of said service brake chambers to operate common brake actuators;
 b. some of said selected service brake chambers have no tandem spring brake chambers associated therewith; and,
 c. said valves are operative to communicate predetermined ones of said some spring brake chambers with predetermined ones of said some service brake chambers at the initiation of spring brake application.

5. In a brake system of the type including service and spring brake chambers, and separate service and spring brake conduits communicating respectively with the service and spring brake chambers to define separate service and spring brake subsystems, the improvement comprising valves connected to the subsystems selectively to establish communication between the spring brake subsystem and the service brake subsystem at the initiation of spring brake application to exhaust fluid from selected spring brake chambers into selected service brake chambers to effect actuation of at least a portion of the service brake subsystem.

6. The brake system of claim 5 wherein some of said selected spring brake chambers are each tandem mounted with a separate one of said selected service brake chambers, and said valves are operative to exhaust fluid from said some selected spring brake chambers into said tandem mounted service brake chambers at the initiation of spring brake application.

7. The brake system of claim 5 wherein at least some of said selected service brake chambers are associated with different vehicle wheels than are said selected spring brake chambers.

8. A vehicle brake system comprising:
 a. a service brake subsystem normally operable when pressurized with fluid above a first predetermined pressure level to apply a vehicle braking force;
 b. an emergency brake subsystem rendered inoperable when pressurized with fluid above a second predetermined pressure level and operable to apply a vehicle braking force whenever fluid pressure in the emergency subsystem is below the second level; and, c. valve means communicating with said service and emergency brake subsystems and being operative to transfer pressurized fluid from said emergency brake subsystem to said service brake subsystem at the initiation of emergency brake application to effect service brake application.

9. The system of claim 8 wherein said valve means includes:

a. a check valve communicating an emergency brake conduit and a service brake conduit for permitting a forward flow of pressurized fluid from the emergency brake subsystem to the service brake subsystem and for preventing reverse flow;

b. first flow restriction means communicating with said emergency brake conduit for venting said emergency brake conduit to atmosphere at a first restricted flow rate; and, c. second flow restriction means communicating with said service brake conduit for venting said service brake conduit to atmosphere at a second restricted flow rate, said second flow rate being less than said first flow rate.

10. The brake system of claim 8 wherein:

a. a source of fluid pressurized at a third predetermined pressure level connects with both the service and spring brake subsystems;

b. said third pressure level is greater than said second pressure, and said second pressure is greater than said first pressure;

c. said emergency brake subsystem is normally pressurized by said source at said third pressure level; and, d. said fluid transferred from said emergency brake subsystem to said service brake subsystem is operable to pressurize said service brake subsystem to said first pressure level before said emergency brake subsystem is depressurized to said second pressure level, whereby said service brake subsystem is brought into operation before said spring brake subsystem at the initiation of spring brake application.

11. A method of effecting a vehicle braking action in a vehicle having a braking system of the type including spring brake actuators and service brake actuators, comprising the step of exhausting fluid from the spring brake actuators into the service brake actuators at the initiation of spring brake application to effect service brake application.

12. A method of improving brake application time in a vehicle having an emergency brake system which is held released by pressurized fluid, and a service brake system which effects a vehicle braking action when supplied with pressurized fluid, comprising the step of interconnecting the emergency and service brake systems with valve means for exhausting fluid from the emergency brake system into the service brake system at the initiation of emergency brake application whereby the service brake system is caused to brake before the emergency brake system is sufficiently depressurized to brake.

13. A method of improving the braking performance of a vehicle of the type having service brake actuators associated with selected wheels and spring brake actuators associated with other wheels, comprising the step of interconnecting the spring and service brake actuators with valve means for exhausting fluid from the spring brake actuators into the service brake actuators at the initiation of spring brake application to cause service brake application of said selected wheels.

14. A highway vehicle brake system comprising:

a. a set of service brake actuators, each actuator of the service set being operably connected to a different service brake with each service brake being associated with a different wheel to apply braking force;

b. a set of spring brake actuators each operably connected to an actuatable brake, each actuatable brake being adapted to apply braking force to a different associated wheel;

c. each service actuator including a brake applying fluid chamber;

d. each spring actuator including a spring release fluid chamber;

e. a source of fluid pressure;

f. conduit structure connecting the source to each of the chambers;

g. the conduit structure including portions connecting the spring release chambers to the brake applying chambers; and, h. fluid pressure control means for selectively controlling the flow of fluid under pressure to and from the chambers including fluid from the spring release chambers through said conduit structure portions to the brake applying chambers.

15. The system of claim 14 wherein the fluid pressure control means includes check valve means in the conduit structure portions for permitting forward fluid flow from the spring release chambers to the brake applying chambers and for preventing reverse flow.

16. The system of claim 15 including:

a. first flow restriction means in the conduit structure portions upstream from the check valve means for venting conduit structure portions upstream from the check valve means at a first restricted flow rate; and, b. second flow restriction means in the conduit structure portions downstream from the check valve means for venting conduit structure portions downstream from the check means at a second restricted flow rate.

17. The vehicle brake system of claim 14 wherein one of said portions of said conduit structure connects one spring release chamber associated with a first wheel with a brake applying chamber associated with a second wheel.

* * * * *

UNITED STATES PATENT AND TRADEMARK OFFICE
CERTIFICATE OF CORRECTION

PATENT NO. : 4,003,606
DATED : January 18, 1977
INVENTOR(S) : Ronald S. Plantan

It is certified that error appears in the above-identified patent and that said Letters Patent are hereby corrected as shown below:

Column 1, line 27, before "system" insert -- vehicle is parked. The spring brake actuators can also be used for emergency braking to stop the vehicle if the service brake --

Column 4, line 9, after "shown).", a new paragraph should begin with "During"

Column 4, line 65, delete "food", substitute -- foot --

Signed and Sealed this

Twenty-fourth Day of May 1977

[SEAL]

Attest:

RUTH C. MASON
Attesting Officer

C. MARSHALL DANN
Commissioner of Patents and Trademarks